(12) United States Patent
Seo

(10) Patent No.: US 7,945,420 B2
(45) Date of Patent: May 17, 2011

(54) ABSOLUTE POSITION MEASUREMENT APPARATUS

(75) Inventor: Yuzo Seo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/206,822

(22) Filed: Sep. 9, 2008

(65) Prior Publication Data

US 2009/0076768 A1   Mar. 19, 2009

(30) Foreign Application Priority Data

Sep. 14, 2007 (JP) .................................. 2007-240135

(51) Int. Cl.
*G01C 17/00* (2006.01)
(52) U.S. Cl. ........................................................ 702/150
(58) Field of Classification Search .................... 702/150
See application file for complete search history.

(56) References Cited

U.S. PATENT DOCUMENTS

| | | | | |
|---|---|---|---|---|
| 4,697,168 A | * | 9/1987 | Baker | 341/15 |
| 5,239,490 A | * | 8/1993 | Masaki et al. | 702/41 |
| 5,585,803 A | * | 12/1996 | Miura et al. | 342/372 |
| 2001/0030299 A1 | * | 10/2001 | Shiraishi | 250/559.29 |
| 2003/0001564 A1 | * | 1/2003 | Hayashi | 324/207.12 |
| 2004/0021078 A1 | * | 2/2004 | Hagler | 250/339.13 |
| 2004/0260499 A1 | * | 12/2004 | Ito et al. | 702/104 |
| 2007/0024863 A1 | | 2/2007 | Kadowaki et al. | |

FOREIGN PATENT DOCUMENTS

JP   2007-033318 A   2/2007

* cited by examiner

*Primary Examiner* — Jonathan C. Teixeira Moffat
(74) *Attorney, Agent, or Firm* — Canon USA, Inc. IP Division

(57) ABSTRACT

An absolute position measurement apparatus includes an output unit, a phase computing unit, a regression computing unit, a phase difference computing unit, an origin position computing unit, and an absolute position calculating unit. The output unit outputs first signals and superimposed signals formed by superimposing second signals on the first signals. The first signals relate to a position of an object to be measured and the first and second signals have a different cycle. The phase computing unit calculates the phase of the first and second signals. The regression computing unit calculates a regression coefficient of the phase of the first signals. The phase difference computing unit calculates a phase difference between phases of the first and second signals. The origin position computing unit determines an origin position of the object to be measured. The absolute position calculating unit calculates an absolute position of the object to be measured.

6 Claims, 3 Drawing Sheets

ABSOLUTE POSITION MEASUREMENT APPARATUS

CROSS REFERENCE TO RELATED APPLICATIONS

This application claims a foreign priority benefit based on Japanese Patent Application 2007-240135, filed on Sep. 14, 2007, which is hereby incorporated by reference herein in its entirety as if fully set forth herein.

BACKGROUND OF THE INVENTION

1. Field of the Invention

The present invention relates to an absolute position measurement apparatus, and more particularly to an absolute position measurement apparatus that outputs signals whose phase changes in accordance with changes in position or angle, such as an encoder or a laser interferometer.

2. Description of the Related Art

Encoders, in general, measure an amount of light transmitting through a scale provided with light transmitting parts and light shielding parts at a certain pitch.

Laser interferometers, in general, split a laser beam into two light beams, one of which is reflected by a mirror provided in a movable part while the other is reflected by a mirror provided to a fixed part, so as to measure intensity of these interference lights.

In either of an encoder or a laser interferometer, the phase of a sine wave output signal changes in accordance with changes in position or angle of an object to be measured. Among these, a measurement apparatus that outputs two-phase signals whose phases are different from each other by 90°, which are approximated by a sine function and a cosine function, is known. A measurement apparatus that outputs three-phase signals whose phases are different at every 120° is also known. That is, encoders and laser interferometers generally output plural signals having different phases.

Signal processing devices used in encoders and laser interferometers perform processing such as arctangent calculation to the plural output signals having different phases to determine the phases of the output signals. Such arithmetic processing enables fine position information of the object to be measured to be obtained, and counting the wave number of the output signals provides rough position signals, which are connected to serve as position signals.

With a measurement apparatus such as an encoder or a laser interferometer, the rough position or angle of the object to be measured is measured by determining a wave number of the signal. However, which point is the origin, i.e., an absolute position or angle, cannot be determined based only on output signals of common encoders or laser interferometers.

Therefore, encoders, in general, are additionally provided with a means of outputting an origin signal. However, with an encoder having a small scale pitch in particular, it is difficult to form an origin signal that is output only in a small range.

As for laser interferometers, a technique is employed for setting a rough origin using other means such as a limit switch to obtain an origin signal. However, outputting an origin signal with high reproducibility in a small range corresponding to one cycle of an interference signal is a technical challenge, and even if it were overcome, the apparatus would be expensive.

Japanese Patent Laid-Open No. 2007-33318 discloses a laser interferometer capable of measuring an origin. The laser interferometer disclosed in this publication is configured using two light sources having different wavelengths and coherence. Japanese Patent Laid-Open No. 2007-33318 also discloses a laser interferometer in which an interference signal having low coherence has sufficient intensity, and a point where the phase difference between both interference signals is zero is determined as the origin.

However, an apparatus for measuring an origin with a method disclosed in Japanese Patent Laid-Open No. 2007-33318 would have an extremely complex structure. An interference signal obtained from a light source with low coherence generally has a large distortion. Because of this, the point where the phase difference between both interference signals is zero is not fixed to one point. Accordingly, it would be difficult to actually form an absolute position measurement apparatus based on this method.

SUMMARY OF THE INVENTION

The present invention provides an absolute position measurement apparatus with a simple structure and high reliability.

An absolute position measurement apparatus as one aspect of the present invention includes an output unit outputting a plurality of first signals whose phase changes in accordance with a position of an object to be measured, and a plurality of superimposed signals formed by superimposing each of a plurality of second signals whose phase changes in accordance with the position of the object to be measured and which have a different cycle from that of the first signals on each of the plurality of first signals, a phase computing unit calculating phases of the first signals during a first period in which the output unit outputs the plurality of first signals, and calculating phases of the second signals during a second period in which the output unit outputs the plurality of superimposed signals, a regression computing unit calculating a regression coefficient of the phase of the first signals calculated by the phase computing unit during the first period, a subtracter calculating a phase difference between the phase of the first signals calculated using the regression coefficient and the phase of the second signals calculated by the phase computing unit during the second period, a phase difference computing unit determining an origin position of the object to be measured based on a position where a sign of the phase difference output from the subtracter is inverted, and an absolute position calculating unit calculating an absolute position of the object to be measured based on the origin position determined by the phase difference computing unit.

DESCRIPTION OF THE EMBODIMENTS

Referring now to the accompanying drawings, a detailed description will be given of embodiments of the present invention.

The absolute position measurement apparatus in this embodiment uses two pairs of signals whose phases change in accordance with changes in position or angle. Each pair of signals consists of a two-phase signal, or a three-phase signal similarly to those of conventional encoders or laser interferometers. The two pairs of signals have slightly different changing speeds of phases, or cycles, with respect to the changes in the position or the angle. The second signals have a large amplitude near an origin of an object to be measured, and the amplitude decreases with an increase in distance from the origin.

Basic hardware components of such a measurement apparatus can easily be formed using known techniques. Forming an optical encoder, for example, is accomplished by using two scales having slightly different pitches. The second scale has normal apertures near the origin, while the degree of opening or width thereof is reduced with an increase in distance from the origin so that desired signals are output.

For a laser interferometer, two light sources having slightly different wavelengths may be used, the second light source being selected from low-coherency light sources having low coherence.

(Structure of the Encoder 200)

Figure 4:
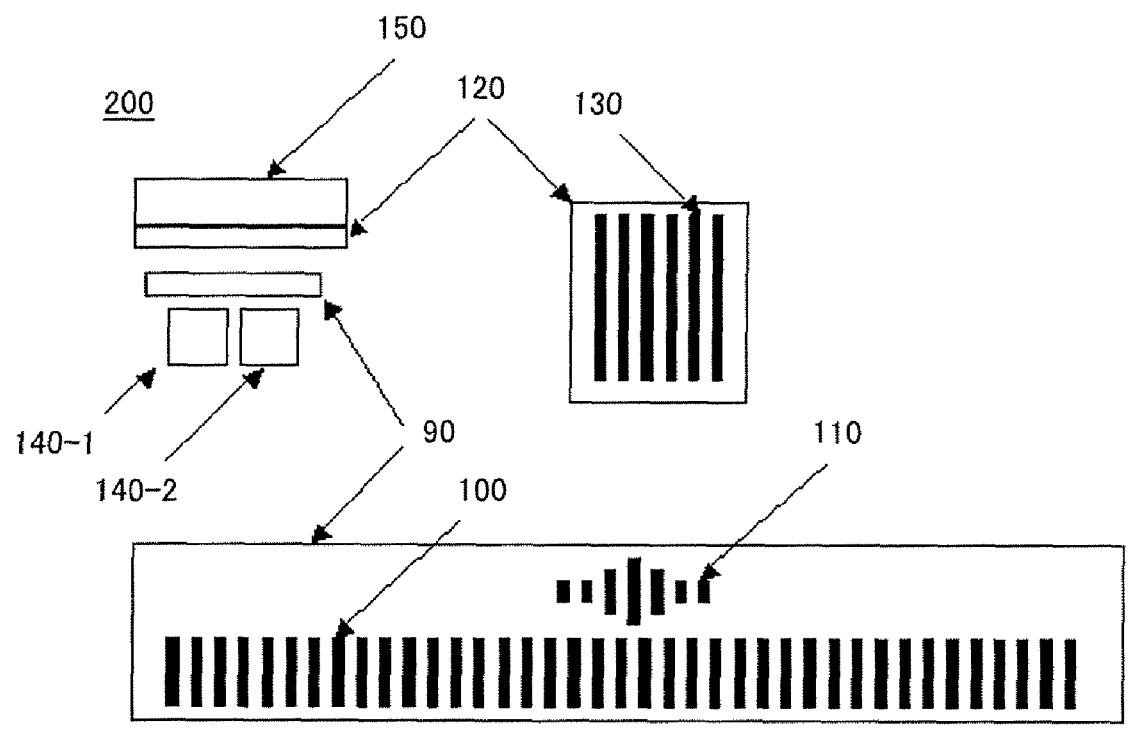
FIG. 4 is a schematic diagram of an encoder applied to the present invention.

An encoder used as one example of a measurement apparatus of the present invention will be described with reference to FIG. 4. FIG. 4 is a schematic diagram of the structure of the encoder.

The encoder 200 is an optical linear encoder which measures a linear mechanical displacement. The encoder 200 includes a movable scale 90, a fixed scale 120, light-emitting elements (light emitting diodes) 140-1 and 140-2, and a light-receiving element (photo diode) 150.

The movable scale 90 is configured to be linearly movable together with an object to be measured. On the other hand, the fixed scale 120 is fixed in position. The encoder 200 is configured such that the movable scale 90 and fixed scale 120 are arranged between the light-emitting elements 140-1 and 140-2 and light-receiving element 150.

The movable scale 90 is provided with slits 100 of a certain width for measuring a distance it has moved. In order to measure an origin of the object to be measured, the movable scale 90 is also provided with slits 110 whose width increases near the origin.

The fixed scale 120 is disposed opposite the movable scale 90 and has fixed slits 130 with the same pitch. The right half and left half of the fixed scale 120 are provided with an aperture at positions with a phase difference of 90°, i.e., at positions different by a quarter of the scale pitch. The light-receiving element 150 is provided on the back surface of the fixed scale 120, i.e., on the opposite surface from the side on which the movable scale 90 is disposed. The light-receiving element 150 has two light-receiving parts corresponding to the positions of the right half and left half of the fixed scale, which output an A-phase signal and a B-phase signal, respectively.

On the back surface of the movable scale 90, i.e., on the opposite surface from the side on which the fixed scale 120 is disposed, the two light-emitting elements 140-1 and 140-2 are provided. In order to measure a displacement length of the object to be measured, the light-emitting element 140-1 provided to the back surface of the constant-width slits 100 is turned on at all times. On the other hand, to measure the origin of the object to be measured, the light-emitting element 140-2 provided to the back surface of the slits 110 with its width increasing near the origin is used in a blinking state when measuring the origin.

Light from the light-emitting elements 140-1 and 140-2 is transmitted or blocked as the movable scale 90 moves.

The A-phase and B-phase output signals based on the slits 100 have phases different from each other by 90° and treated as a first pair of signals (C1, S1) to be described later. The A'-phase and B'-phase output signals based on the slits 110 have phases different from each other by 90° and treated as a second pair of signals (C2, S2) to be described later.

The output signals (A-phase, B-phase) of the light-receiving element are processed by a measurement unit shown in FIG. 1 as will be described later. At the origin position of the object to be measured, the intensity of the second signals (C2, S2) is maximum at a point where the width of the slits 110 opposite the fixed scale 120 is the largest. This, as a result, enables precise measurement of the origin of the object to be measured.

The encoder 200 is provided with a position measurement unit 400 to be described later for processing output signals of the light-receiving element.

(Structure of the Laser Interferometer 300)

Figure 5B:
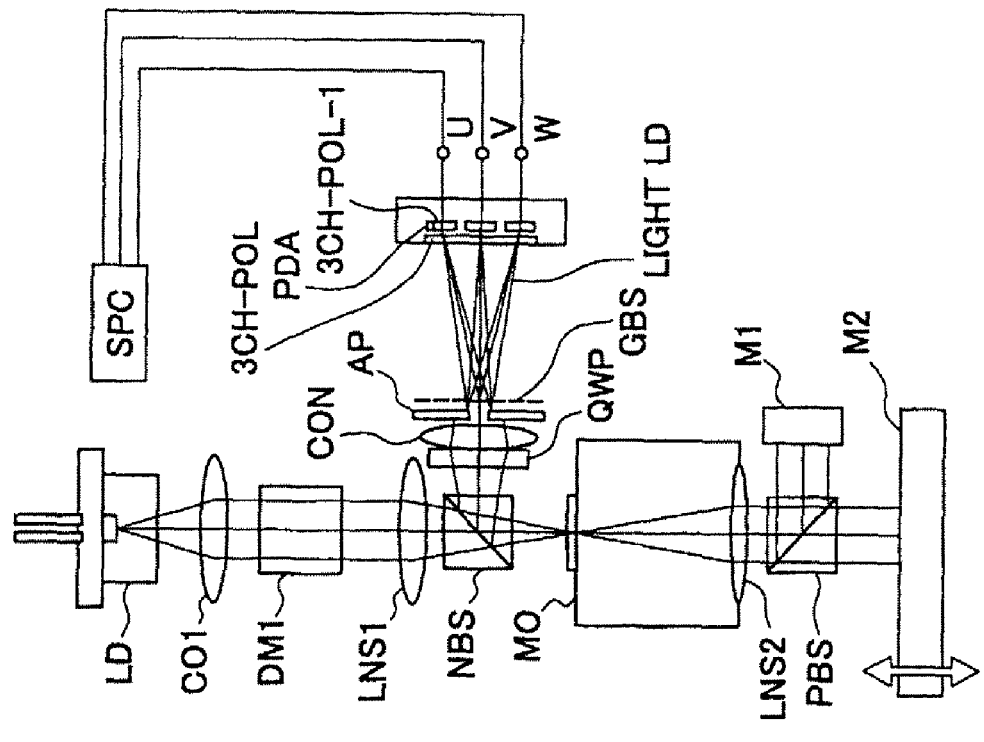
FIG. 5B is a front view of the laser interferometer.
Figure 5A:
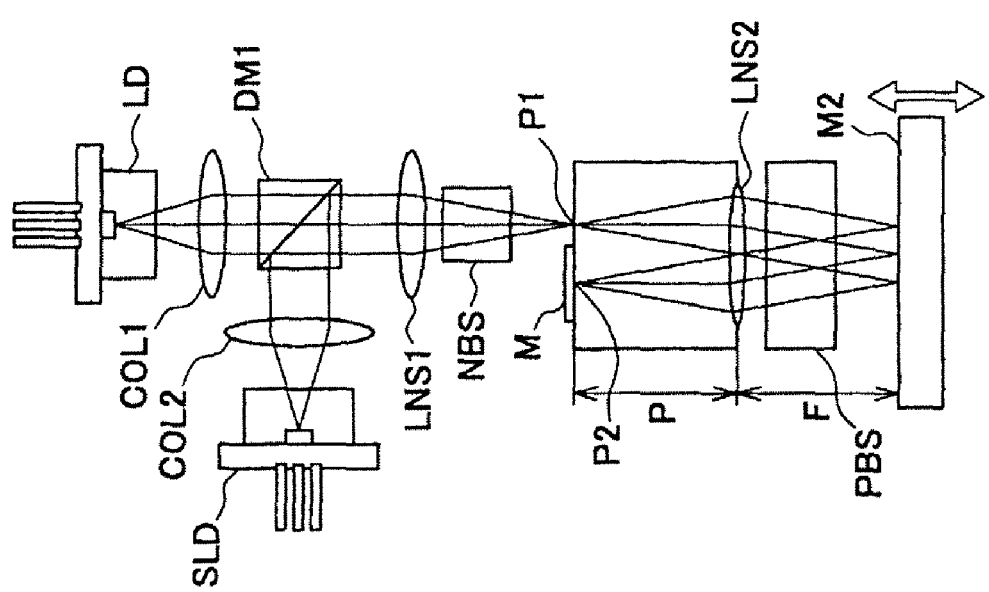
FIG. 5A is a side view of a laser interferometer applied to the present invention.

Next, the structure of a laser interferometer used as one example of the measurement apparatus of the present invention will be described with reference to FIGS. 5A and 5B. FIG. 5A is a side view of the laser interferometer and FIG. 5B is a front view of the laser interferometer.

The laser interferometer 300 uses a surface emission laser (VCSEL) having a stable laser wavelength $\lambda$ of 0.85 μm as a high-coherency single-mode semiconductor laser LD (semi-conductor laser LD). As a low-coherency laser SLD, a super luminescent diode SLD (diode SLD) with a spectral half bandwidth $\Delta\Lambda$ of about 15 nm and a central wavelength $\lambda'$ of about 0.82 μm is used.

The power spectrum of light from the semiconductor laser LD is an emission line at 0.85 μm. The power spectrum of light from the diode SLD is similar to a Lorentz type power spectrum in which the central wavelength is 0.82 μm and the half bandwidth is 15 nm. A power spectrum S ($\Delta\lambda$) corresponding to a wavelength difference $\Delta\lambda$ from the central wavelength (0.82 μm) of the light from the diode SLD is represented by the following equation:

$$S(\Delta\lambda) = (\Delta\Lambda/2)2 / \{\Delta\lambda2 + (\Delta\Lambda/2)2\} \quad \text{(Expression 1)}$$

where, $\Delta\Lambda$ represents the half bandwidth, which is 15 nm in this case.

The light beams from the semiconductor laser LD and diode SLD turn respectively into collimator light (parallel light) through collimator lenses COL1 and COL2. These light beams are multiplexed by a dichroic mirror DM1 onto the same optical axis and converged through a lens LNS1 and a half mirror NBS to illuminate a position P1 on the focal surface of a lens LNS2.

The spectra of the semiconductor laser LD and diode SLD are as described above. Thus, the dichroic mirror DM1 has a boundary of transmission and reflection characteristics near the wavelength of 0.84 μm, so that these light beams are multiplexed at the dichroic mirror DM1.

The light beams from the position P1 is emerged from the lens LNS2 as a parallel light beam having a slightly tilted optical axis. A polarization beam splitter (light splitting means) PBS splits the light beam into two light beams on the basis of polarization components. Reflected light (S-polarized light) from the polarization beam splitter PBS impinges on a reference mirror (reference surface) M1, while transmitted light (P-polarized light) from the polarization beam splitter PBS impinges on a measurement mirror (measurement surface) M2 which is a surface to be measured.

The lights reflected by these surfaces are combined through the polarization beam splitter PBS and converged to illuminate a position P2 on the focal surface of the lens LNS2. The light is then returned to the original light path by a reflective film M0 provided in the vicinity thereof. The reflected light from the position P2 is emerged from the lens LNS2 as a parallel light beam, and split into two light beams by the polarization beam splitter PBS. The reflected light (S-polarized light) illuminates the reference mirror M1, while the transmitted light (P-polarized light) illuminates the surface to be measured (mirror) M2.

The lights reflected by these surfaces are converged through the polarization beam splitter PBS to illuminate the position P1 on the focal surface of the lens LNS2.

Portions of these light beams are extracted on the light source side (S-polarized light reciprocates between the reference surface M1 and beam splitter PBS twice, while P-polarized light reciprocates between the surface being measured M2 and beam splitter PBS twice). These light beams are extracted on the light-receiving system side via a non-polarization beam splitter (half mirror) NBS, transmitted through a quarter-wave plate QWP to be converted into a linear polarized light, whose polarization direction rotates in accordance with changes in phase difference.

This light beam is split into three light beams by a beam splitting element GBS through a converging lens CON and an aperture AP. The three light beams enter polarization element arrays 3CH-POL that have their transmission axes shifted by 60° from each other.

The lights passing through the polarization element arrays 3CH-POL enter light-receiving parts of a tripartition light-receiving element PDA. Thereby, three interference signals UVW having phases shifted by 120° are detected based on an out-of-surface displacement of the surface being measured (mirror) M2.

The laser interferometer 300 uses interference signals from two light sources. However, the main body of the interferometer and an analog/digital converter are shared by both light sources. Therefore, the main body of the interferometer needs to be provided only with a means for introducing the second light source. This realizes addition of an origin detection function at low cost and obviates most of necessary work such as adjustment. On the other hand, it is necessary to separate these two interference signals in the signal processing device SPC.

Separation of two interference signals is achieved by (1) blinking the second light source, and (2) predicting an interference signal by the first light source during the second light source is turned on through temporary regression of the phase of the interference signal by the first light source during the second light source is turned off.

There can be a technique in which the first light source is turned off during the second light source is turned on. However, when a semiconductor laser is used for the light source as in this embodiment, lighting the light source changes temperature and deteriorates wavelength stability. Accordingly, it is preferable to keep the first light source (semiconductor laser LD) which is also used for normal measurement always turned on, while the second light source (diode SLD) is blinked.

In this case, there are a period in which signals are output by the first light source (semiconductor laser LD) and a period in which signals from both light sources are superimposed and output. Therefore, it is necessary to subtract signal components of the first light source (semiconductor laser LD) from the superimposed signals to calculate signals by the second light source (diode SLD).

The components of the signals from the first light source are predicted by determining phases when only the first light source was turned on and phases of the signals by the first light source using, as will be described later, a regression coefficient between phase and time, and by performing arithmetic processing of a trigonometric function thereto.

The computing means SPC of the laser interferometer 300 is provided with the position measurement unit 400 to be described later. The position measurement unit 400 measures the phases of the first interference signals (C1, S1) by the first light source during the first period in which only the first light source (semiconductor laser LD) is turned on.

During the second period in which the second light source (diode SLD) is also turned on, the light-receiving element detects superimposed signals in which the first interference signals (C1, S1) and second interference signals (C2, S2) by the second light source are superimposed. During the second period, the position measurement unit 400 obtains the second interference signals by subtracting the first interference signals from the superimposed signals to measure the phases of the second interference signals.

The origin is detected as a position where the amplitude of the second signals is sufficiently large, as well as the sign of the phase difference between the first and second signals is inverted.

However, since phase changes of the first and second signals are similar to each other, the precision of the difference therebetween is degraded, and it is difficult to detect the position where the sign of the phase difference is inverted with good reproducibility.

In general, when calculating a phase by arithmetic processing, a distortion component contained in the signal, i.e., a bias from the sine wave, constitutes an error factor. Same such error is repeated per every cycle of the signal. Therefore, averaging the phase difference over one cycle of a signal can efficiently remove the error caused by a signal distortion. That is, an average value of the phase difference over one cycle of the signal may be determined, so as to detect the position where the sign thereof is inverted as the origin of the object to be measured.

The sign referred to here is the sign of an average value. However, the sign of an average value is identical to a sign of a sum value. Therefore, the same result will be obtained if the position where the sign of the sum of phase differences over one cycle of the signal is determined as the origin. Such a configuration enables omission of division processing for determining an average value.

(Structure of the Position Measurement Unit 400)

Next, the position measurement unit 400 in the absolute position measurement apparatus will be described in detail. FIG. 1 is a block diagram of the position measurement unit.

Figure 1:
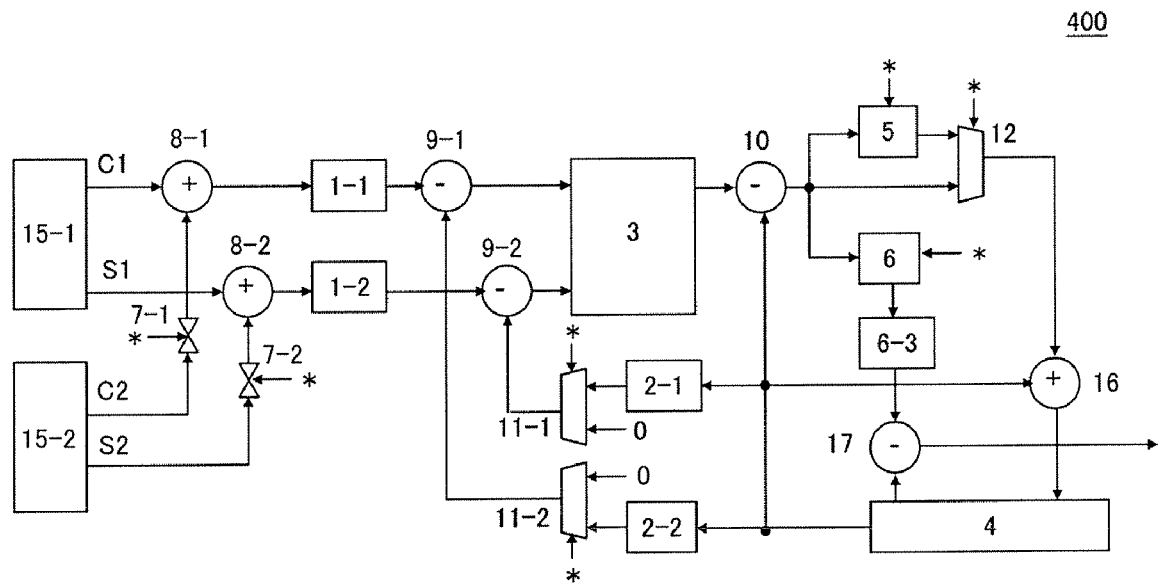
FIG. 1 is a block diagram of a position measurement unit in the present invention.

Adders 8-1 and 8-2 in FIG. 1 are conceptually illustrated for easy understanding of superimposed signals. In an actual measurement apparatus, such addition processing is performed in the main body of an encoder or an interferometer.

Of the output signals of the encoder 200 or laser interferometer 300, an A-phase, B-phase, A'-phase, and B'-phase signals are respectively represented as a cosine signal C1, sine signal S1, cosine signal C2, and sine signal S2. The cosine signal C1 and sine signal S1 are indicated as a first pair of signals (C1, S1). Similarly, the cosine signal C2 and sine signal S2 are indicated as a second pair of signals (C2, S2).

Reference numeral 15-1 denotes a virtual first output means (an output unit), which outputs the first pair of signals (C1, S1) from the above encoder 200 or laser interferometer 300. Reference numeral 15-2 denotes a virtual second output means (an output unit), which outputs the second pair of signals (C2, S2) from the above encoder 200 or laser interferometer 300.

To determine the phases of the first and second signals, analog/digital converters 1-1 and 1-2 for converting analog signals into digital signals are used. However, analog/digital converters are generally expensive.

Therefore, it is preferable to perform the digitizing process of the first and second signals with the same analog/digital converter. This is realized by temporally alternately measuring the first pair of signals (C1, S1) and second pair of signals (C2, S2). In this embodiment, the period in which the first pair of signals (C1, S1) is measured is defined as a first period, while the period in which the second pair of signals (C2, S2) is measured is defined as a second period.

The cosine signals C1 and C2 are superimposed by the adder 8-1 and input into the analog/digital converter 1-1 to be converted into digital signals. The sine signals S1 and S2 are superimposed by the adder 8-2 and input into the analog/digital converter 1-2 to be converted into digital signals.

The second pair of signals (C2, S2) is controlled to be on and off in a short cycle. In this embodiment, the cycle of the on/off control is set to be 10 kHz. The cycle is not limited to this particular example and it may be controlled to be on and off in other cycles. The amplitude of the second pair of signals (C2, S2) becomes the largest at a reference point corresponding to an origin position of the object to be measured.

The first pair of signals (C1, S1) is a signal used when performing normal position detection. On the other hand, the second pair of signals (C2, S2) is a signal used specially for detecting an origin position of the object to be measured.

Virtually illustrated analog switches 7-1 and 7-2 are controlled to be in a conducting state (On state) when the second pair of signals (C2, S2) is superimposed on the first pair of signals (C1, S1). This period is the second period, when the superimposed signals of the first pair of signals (C1, S1) and second pair of signals (C2, S2) are input to the analog/digital converters 1-1 and 1-2.

On the other hand, the analog switches 7-1 and 7-2 are controlled to be in a blocking state (Off state) when blocking the output of the second pair of signals (C2, S2). This period is the first period, when only the first pair of signals (C1, S1) is input to the analog/digital converters 1-1 and 1-2. The second pair of signals (C2, S2) is thus input to the analog/digital converters 1-1 and 1-2 every certain period by being superimposed on the first signals.

As described above, the on/off control of the output of the second pair of signals (C2, S2) is illustrated in FIG. 1 in a form that uses the analog switches 7-1 and 7-1. Actually, the light source, for example, which is the origin of output signals, is controlled to be on and off instead of the analog switches 7-1 and 7-2 to realize the same effect.

Reference symbol "*" in FIG. 1 denotes a selection signal indicating whether or not the second pair of signals (C2, S2) is superimposed. The operation of various units is controlled based on this selection signal.

When the analog switches 7-1 and 7-2 are in a blocking state so that the output of the second pair of signals (C2, S2) is blocked, only the first pair of signals (C1, S1) is input to the analog/digital converters 1-1 and 1-2. At this time, digital signals of the first pair of signals (C1, S1) output from the analog/digital converters 1-1 and 1-2 are input as they are into a phase computing unit 3.

On the other hand, when the analog switches 7-1 and 7-2 are in a conducting state, superimposed signals of the first pair of signals (C1, S1) and second pair of signals (C2, S2) are input to the analog/digital converters 1-1 and 1-2. Therefore, digital signals output from the analog/digital converters 1-1 and 1-2 indicate the superimposed signals of the first pair of signals (C1, S1) and second pair of signals (C2, S2).

Here, as will be described later, current values of the first pair of signals (C1, S1) are predicted using previously updated phases of the first pair of signals (C1, S1). Predicted values of the first pair of signals (C1, S1) are calculated by predictors 2-1 and 2-2.

Multiplexers 11-1 and 11-2, when the first pair of signals (C1, S1) and second pair of signals (C2, S2) are superimposed, select the signals of the predictors 2-1 and 2-2 and output the same to subtracters 9-1 and 9-2. On the other hand, the multiplexers 11-1 and 11-2, when the output of the second pair of signals (C2, S2) is blocked, select a zero signal and output the same to the subtracters 9-1 and 9-2.

The values of the superimposed signals in which the first pair of signals (C1, S1) and second pair of signals (C2, S2) are superimposed are subtracted by the subtracters 9-1 and 9-2, using predicted values of the first pair of signals (C1, S1) calculated by the predictors 2-1 and 2-2.

This arithmetic processing enables inputting of digital signals of the second pair of signals (C2, S2) to the phase computing unit 3 during the period in which the first pair of signals (C1, S1) and second pair of signals (C2, S2) are superimposed.

As described above, when the analog switches 7-1 and 7-2 are in a blocking state so that the output of the second pair of signals (C2, S2) is blocked, digital signals of the first pair of signals (C1, S1) are input to the phase computing unit 3. On the other hand, when the analog switches 7-1 and 7-2 are in a conducting state in which the second pair of signals (C2, S2) is superimposed, digital signals of the second pair of signals (C2, S2) are input to the phase computing unit 3. The phase computing unit 3 calculates a phase of the first signals or second signals.

The phase of the first signals calculated at the phase computing unit 3 is input to a regression computing unit 5. The regression computing unit 5 calculates a regression coefficient relative to measurement time of the phase of the first signals, based on the phase of the first signals calculated at the phase computing unit 3. The regression coefficient is calculated by multiplying an exponential weighting factor in accordance with time that has passed from the measurement time to the phase of the first signals, which are measured values. The regression coefficient calculated at the regression computing unit 5 is input to multiplexer 12.

The predictors 2-1 and 2-2 calculate current predicted values of the first pair of signals (C1, S1) as mentioned above, when the first pair of signals (C1, S1) and second pair of signals (C2, S2) are superimposed. The phase of the first signals in the superimposed period are thus calculated using a regression coefficient of the first signals.

The phase of the first signals calculated at the phase computing unit 3 is also input to an internal register 4 through a multiplexer 12. The phase of the first signals input to the internal register 4 is stored in the internal register 4. The phase of the first signals is updated every time the phase computing unit 3 calculates the phase of the first signals.

The internal register 4 has a bit length longer than a bit length necessary for storing the phase information of the first signals. Higher-order bits of the internal register 4 store the wave number (cycle) of the first signals.

When the first pair of signals (C1, S1) has been input to the phase computing unit 3, a subtracter 10 subtracts a stored value in the internal register 4 from the output value from the phase computing unit 3. The subtracted value is added to the stored value in the internal register 4.

On the other hand, when the second pair of signals (C2, S2) has been input to the phase computing unit 3, using an adder 16, a changing speed (regression coefficient) output from the regression computing unit 5 is added to the value in the internal register 4. At this time, the phase and wave number information of the first pair of signals (C1, S1) is updated. When adding the value to the internal register 4, sign extension is performed to match the bit length of the internal register 4.

During the superimposed period (second period), a phase of the second pair of signals (C2, S2) output from the phase computing unit 3 is subtracted in the subtracter 10 from the phase of the first signals that are stored in the internal register 4 or updated. This subtracted value corresponds to a phase difference between the first and second signals.

That is, the subtracter 10 calculates a phase difference between the phase of the first signals calculated using a regression coefficient and the phase of the second signals calculated at the phase computing unit 3 during the second period. The phase difference calculated at the subtracter 10 is input to a phase difference addition processing device 6. Hereinafter, the phase difference addition processing device 6 will be described in detail.

Figure 2:
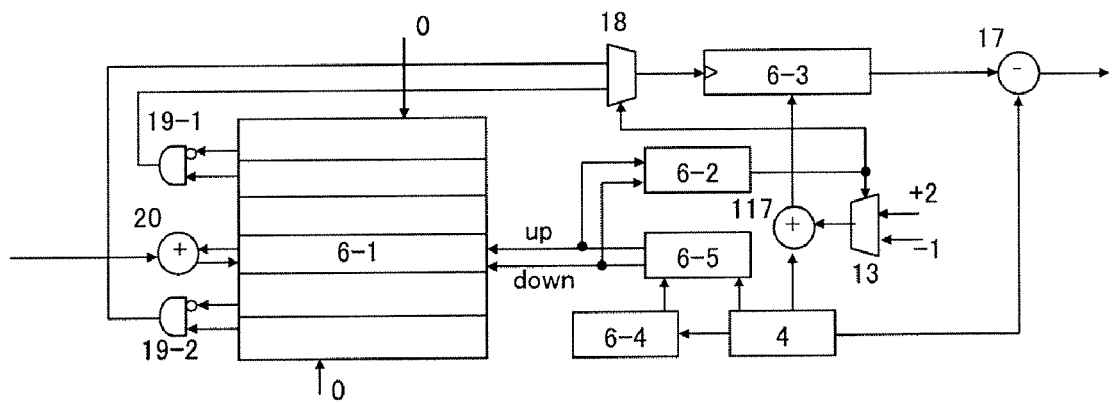
FIG. 2 is a block diagram of a phase difference addition processing device in the present invention.

FIG. 2 shows a block diagram of the phase difference addition processing device 6. The phase difference addition processing device 6 is a phase difference computing means (a phase difference computing unit) which determines an origin position of the object to be measured from a position where the sign of the phase difference output from the subtracter 10 is inverted.

The phase difference addition processing device 6 operates only during the superimposed period in which the first pair of signals (C1, S1) and second pair of signals (C2, S2) are superimposed.

The phase difference between the second signals and first signals is stored through an adder 20 in a shift register 6-1 that has five regions, and integrated in a substantially central region of the shift register 6-1. Higher-order bits of the internal register 4 storing the phases of the first pair of signals (C1, S1) store the wave number (cycle) of the first pair of signals.

The phase and wave number (cycle) of the first signals stored in the internal register 4 are stored in a register 6-4 before being updated. The cycle of the first signals stored in the register 6-4 before the update is compared in a comparator 6-5 with a cycle of the first signals stored in the internal register 4 after the update. The result of comparison at the comparator 6-5 is transmitted to the shift register 6-1 and an RS flip-flop 6-2.

The values stored in the shift register 6-1 are shifted downwards when the cycle of the first pair of signals (C1, S1) turns positive. On the other hand, the values stored in the shift register 6-1 are shifted upwards when the cycle of the first pair of signals (C1, S1) turns negative.

When the values stored in the shift register 6-1 are shifted downwards, a zero value is shifted in to an uppermost portion of the shift register 6-1. On the other hand, when the values stored in the shift register 6-1 are shifted upwards, a zero value is shifted in to a lowermost portion of the shift register 6-1.

Information as to whether the values stored in the shift register 6-1 were shifted upwards or downwards the last time is input to and stored in the RS flip-flop 6-2.

When the RS flip-flop 6-2 indicates that the values stored in the shift register 6-1 were shifted upwards the last time, the signs of the values stored in upper two regions of the shift register 6-1 are compared. On the other hand, when the RS flip-flop 6-2 indicates that the shift register 6-1 was shifted downwards the last time, the signs of the values stored in lower two regions of the shift register 6-1 are compared.

If, in the shift register 6-1, the signs of the values stored in the selected two regions differ from each other, determination is made as follows.

When comparison was made between the upper two regions of the shift register 6-1, it means that the origin is at a position two cycles above the current integration position.

When comparison was made between the lower two regions of the shift register 6-1, it means that the origin is at a position one cycle below the current integration position. The cycles of the current signals are stored in higher-order bits that are higher-order extension portions of the internal register 4 storing the phases of the first signals.

Therefore, a value obtained by adding two to or subtracting one from the higher-order bits of the internal register 4 is stored in a bias register 6-3 via a multiplexer 13 and an adder 117. The adder 117 is an absolute position calculating means (an absolute position calculating unit) for calculating an absolute position of the object to be measured from the origin position determined by the phase difference addition processing device 6.

The bias register 6-3, if the signs of the compared values are different, stores the above value based on the signals input via logic circuits 19-1 and 19-2 and a multiplexer 18. A value obtained by subtracting this value by a subtracter 17 from the wave number (cycle) stored in the internal register 4 indicates the absolute position of the object to be measured.

The phase difference addition processing device 6 may be configured such that it adds up or averages the phase differences between the first and second signals calculated by the phase computing unit 3 over one cycle of the first signals. A plurality of such sum values or average values are stored per each cycle of the first signals. The origin position of the object to be measured is determined by detecting the point where the sign of accumulated values in adjacent cycles is inverted. Such a configuration enables detection of position where the sign is inverted with good reproducibility.

Next, the regression computing unit 5 will be described in detail. The regression computing unit 5 calculates the regression coefficient of the phase of the first signals. The regression coefficient is calculated by multiplying an exponential weighting factor corresponding to time that has passed from measurement time to each measured value.

Figure 3:
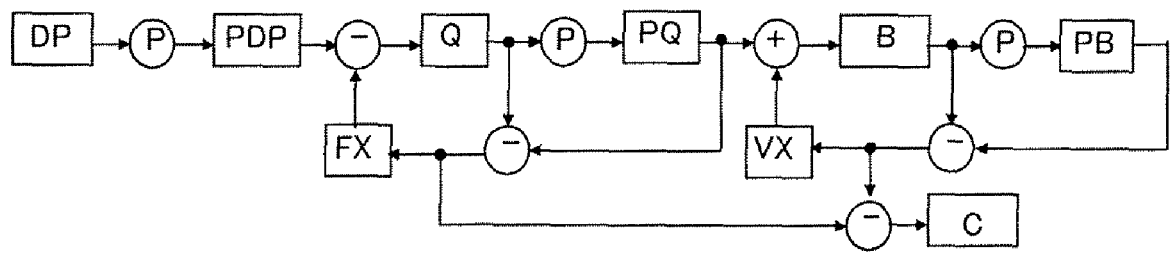
FIG. 3 is a block diagram of a regression computing unit in the present invention.

FIG. 3 shows an internal block diagram of the regression computing unit 5. The configuration shown in FIG. 3 is commonly known as Carman filter. Here, an explanation of the principle is omitted, and only one example of the configuration is illustrated. Registers of the regression computing unit 5 are updated when only the first pair of signals (C1, S1) is input.

Reference symbol DP denotes a difference between the latest phase and previous phase of the first pair of signals (C1, S1). Reference symbol PDP denotes a register for storing the phase difference DP. The register PDP shifts rightwards by predetermined P-bits to store the phase difference DP.

A value obtained by subtracting the value of a register FX from the value of the register PDP is stored in a register Q. Next, a value obtained by shifting the value of the register Q rightwards by P-bits is stored in a register PQ. A value obtained by subtracting the value of the register PQ from the value of the register Q is stored in the register FX.

A value obtained by adding a value of a register VX to the value of the register PQ is stored in a register B. The register B is a value corresponding to the changing speed of the phase of the first pair of signals (C1, S1). This is used for updating the phases of the first pair of signals (C1, S1) when the first pair of signals (C1, S1) and second pair of signals (C2, S2) are superimposed.

A value obtained by shifting the value of the register B rightwards by P-bits is stored in a register PB. A value obtained by subtracting the content of the register PB from the value of the register B is stored in a register VX.

A value C obtained by subtracting the value of the register VX from the value of the register FX becomes a constant term in a regression expression in the regression computation. The constant term can also be utilized for the purpose of removing noise contained in the measured phase of the first pair of signals (C1, S1).

The origin of the object to be measured is determined on the basis of a phase difference between the first signals and second signals. Therefore, it is necessary, during measurement of one of the first and second signals, to predict the phase of the other signals. In this embodiment, a regression coefficient corresponding to the measurement time of the phases of the first signals is calculated, and the phase of the first signals at the measurement time of the phases of the second signals is calculated using the regression coefficient. At this time, the regression coefficient is calculated by multiplying an exponential weighting factor corresponding to time that has passed from the measurement time to each measured value.

Conventional common regression computation is performed using several tens to several hundreds pairs of data, giving equal weight to these data. Such computing method, however, requires a large number of memory regions and the computation is complex.

In contrast, as in the regression computation of this embodiment in which a weighting factor that exponentially decreases in accordance with time that has passed, only the latest integrated value is recorded, which is updated every time a new value is obtained. Therefore, a large reduction in the amount of memory regions and load of computing means is possible.

The phase difference between the first and second interference signals changes substantially linearly with the changes in position. This cycle is represented as $\lambda 1/(\lambda 1-\lambda 2)$, where the cycle $\lambda 1$ of the first interference signals indicates the position. In this case, $\lambda 2$ is the cycle of the second interference signals.

When the wavelengths of the first and second light sources are extremely close to each other, the cycle of phase difference changes is very long. In this case, however, the phase difference change relative to a change in position is small and detection of a position where the sign is inverted is more susceptible to the effects of noise and waveform distortion.

On the other hand, when the difference in wavelength between both light sources is large, the phase difference change relative to a change in position is large, making it easy to detect the position where the sign is inverted. However, the cycle of phase difference changes becomes short, so that there are plural points where the phase difference is zero within a position range in which the second light source outputs interference signals.

In the measurement apparatus of this embodiment, the amplitude of the second pair of signals (C2, S2) becomes largest at a reference point corresponding to an origin of the object to be measured.

This makes it possible to use the fact that the amplitude of the second pair of signals (C2, S2) exceeds a predetermined value as a condition of being the origin of the object to be measured. Here, the measurement apparatus of this embodiment is provided with an amplitude detecting means (an amplitude detector) for detecting whether or not the amplitude size, i.e., the amplitude of the second signals, exceeds a predetermined value.

The measurement apparatus can thus determine the origin position of the object to be measured, utilizing the difference between the phases of the first and second signals, and the amplitude size of the second signals. Adding the condition of the amplitude size of the second signals to the condition of the phase difference between the first and second signals makes it possible to provide a measurement apparatus that is higher in reliability.

As described above in detail, the absolute position measurement apparatus of the present invention enables precise measurement of an origin of an object to be measured with a simple hardware structure. This in turn enables provision of an absolute position measurement apparatus that is inexpensive and highly precise.

The position measurement unit (logic operation unit) can be easily configured as an LSI circuit. Therefore, when high-speed is not required for the measurement apparatus, the position measurement unit can be realized by a software, using a microprocessor or a DSP. If such a configuration is to be adopted, the measurement apparatus can be configured even more inexpensively with higher precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An absolute position measurement apparatus, comprising:

an output unit configured to output a plurality of first signals having a phase that changes in accordance with a position of an object to be measured and a plurality of superimposed signals formed by superimposing each of a plurality of second signals on each of the plurality of first signals, wherein a phase of the plurality of second signals changes in accordance with the position of the object to be measured, and the plurality of second signals have a different cycle from that of the plurality of first signals;

a phase computing unit configured to calculate the phase of the plurality of first signals during a first period in which the output unit outputs the plurality of first signals, and calculate the phase of the plurality of second signals during a second period in which the output unit outputs the plurality of superimposed signals;

a regression computing unit configured to calculate a regression coefficient of the phase of the plurality of first signals;

a phase difference computing unit configured to calculate a phase difference between the phase of the plurality of first signals and the phase of the plurality of second signals calculated by the phase computing unit during the second period, wherein the phase difference is calculated using the regression coefficient;

an origin position computing unit configured to determine an origin position of the object to be measured based on a position where a sign of the phase difference that is output from the phase difference computing unit is inverted; and an absolute position calculating unit configured to calculate an absolute position of the object to be measured based on the origin position, wherein the regression computing unit calculates the regression coefficient by multiplying an exponential weighting factor in accordance with time that has passed from a time point of measurement to the phase of the plurality of first signals calculated by the origin position computing unit.

2. An absolute position measurement apparatus according to claim 1, further comprising an amplitude detector configured to detect an amplitude size of the plurality of second signals, wherein the absolute position measurement apparatus determines the origin position of the object to be measured utilizing the phase difference between the phase of the plurality of first signals and the phase of the plurality of second signals and the amplitude size of the plurality of second signals.

3. An absolute position measurement apparatus according to claim 1, wherein the origin position computing unit stores a plurality of values obtained by adding up or averaging the phase differences between the plurality of first signals and the plurality of second signals over one cycle of the plurality of first signals per every cycle of the plurality of first signals, and wherein the origin position computing unit determines the origin position of the object to be measured by detecting an inversion of signs of the added-up or averaged values of adjacent cycles.

4. An absolute position measurement apparatus, comprising:

an output unit configured to output a plurality of first signals having a phase that changes in accordance with a position of an object to be measured and a plurality of superimposed signals formed by superimposing each of a plurality of second signals on each of the plurality of first signals, wherein a phase of the plurality of second signals changes in accordance with the position of the object to be measured, and the plurality of second signals have a different cycle from that of the plurality of first signals;

a phase computing unit configured to calculate the phase of the plurality of first signals during a first period in which the output unit outputs the plurality of first signals, and calculate the phase of the plurality of second signals during a second period in which the output unit outputs the plurality of superimposed signals;

a regression computing unit configured to calculate a regression coefficient of the phase of the plurality of first signals;

a phase difference computing unit configured to calculate a phase difference between the phase of the plurality of first signals and the phase of the plurality of second signals calculated by the phase computing unit during the second period, wherein the phase difference is calculated using the regression coefficient;

an origin position computing unit configured to determine an origin position of the object to be measured based on a position where a sign of the phase difference that is output from the phase difference computing unit is inverted; and an absolute position calculating unit configured to calculate an absolute position of the object to be measured based on the origin position, wherein the plurality of first signals and the plurality of superimposed signals output from the output unit are input to an analog/digital converter, wherein the plurality of first signals are always input to the analog/digital converter, wherein the plurality of superimposed signals are input to the analog/digital converter every constant period by superimposing the plurality of second signals on the plurality of first signals, wherein the analog/digital converter temporally alternately processes the plurality of first signals and the plurality of superimposed signals, and wherein the plurality of second signals input to the phase computing unit are calculated by subtracting the plurality of first signals that are calculated using the regression coefficient from the plurality of superimposed signals.

5. An absolute position measurement apparatus according to claim 4, further comprising an amplitude detector configured to detect an amplitude size of the plurality of second signals, wherein the absolute position measurement apparatus determines the origin position of the object to be measured utilizing the phase difference between the phase of the plurality of first signals and the phase of the plurality of second signals and the amplitude size of the plurality of second signals.

6. An absolute position measurement apparatus according to claim 4, wherein the origin position computing unit stores a plurality of values obtained by adding up or averaging the phase differences between the plurality of first signals and the plurality of second signals over one cycle of the plurality of first signals per every cycle of the plurality of first signals, and wherein the origin position computing unit determines the origin position of the object to be measured by detecting an inversion of signs of the added-up or averaged values of adjacent cycles.

* * * * *